Dec. 21, 1954 L. WOLK 2,697,768
CIRCULAR SEAM WELDING APPARATUS
Filed March 12, 1952 2 Sheets-Sheet 1
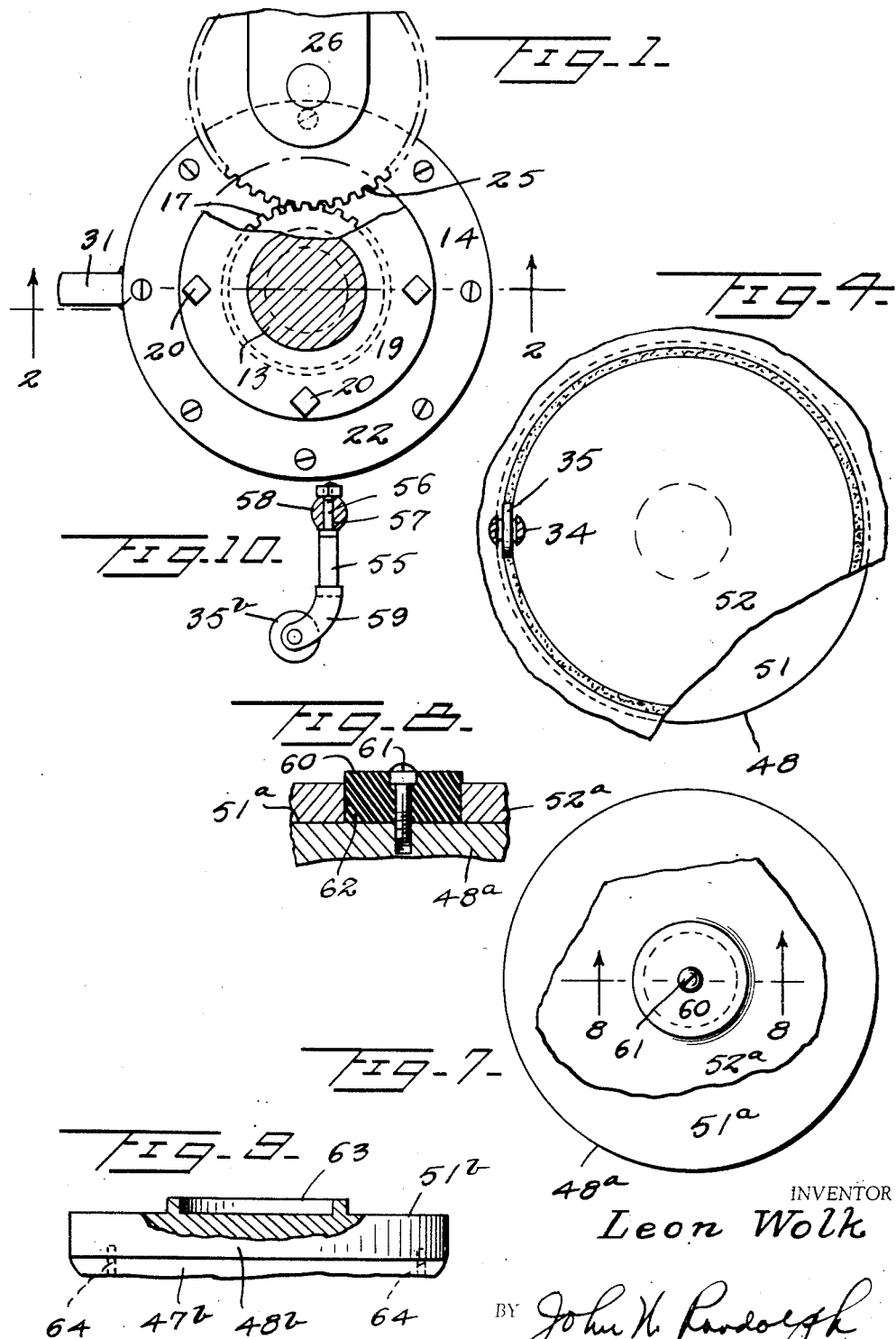
INVENTOR
*Leon Wolk*
BY *John H. Randolph*
ATTORNEY Dec. 21, 1954   L. WOLK   2,697,768
CIRCULAR SEAM WELDING APPARATUS
Filed March 12, 1952   2 Sheets-Sheet 2
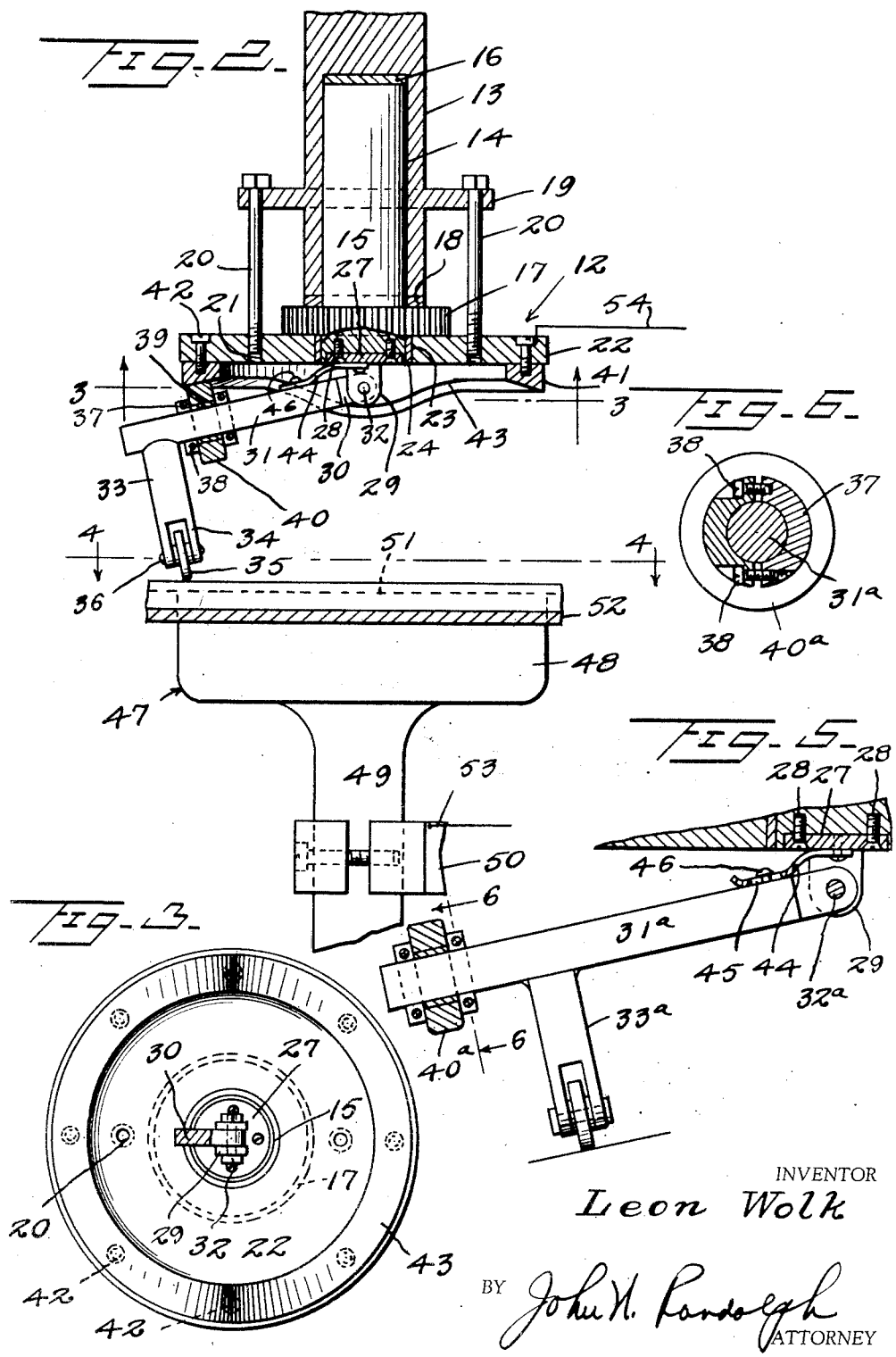
INVENTOR
Leon Wolk
BY John H. Randolph
ATTORNEY

United States Patent Office 2,697,768
Patented Dec. 21, 1954

2,697,768

CIRCULAR SEAM WELDING APPARATUS

Leon Wolk, Rockville, Conn.

Application March 12, 1952, Serial No. 276,140

5 Claims. (Cl. 219—4)

This invention relates to a novel apparatus for accomplishing circular seam welds of different diameters or radii and more particularly to a seam welder including a single moving element for cooperation with a stationary element or platen.

More particularly, it is an aim of the present invention to provide an apparatus whereby circular seam welds may be readily made on surfaces of different shapes for accomplishing such work as welding flanges and bosses to flat, cylindrical or curved surfaces.

Still a further object of the invention is to provide a circular seam welder having a revolving rotary seam wheel constituting a movable electrode of the welder which may be caused to travel in undulating paths for following the curvature of a curved surface such as a cylinder.

Various other objects and advantages of the invention will hereinafter become more fully apparent from the following description of the drawings, illustrating a presently preferred embodiment thereof, and wherein:

Figure 1 is a top plan view, partly in horizontal section of the welding apparatus;

Figure 2 is a vertical sectional view, partly in side elevation thereof, taken substantially along a plane as indicated by the line 2—2 of Figure 1;

Figure 3 is a sectional view taken substantially along a plane as indicated by the line 3—3 of Figure 2;

Figure 4 is a horizontal sectional view taken substantially along a plane as indicated by the line 4—4 of Figure 2;

Figure 5 is a fragmentary side elevational view, partly in vertical section similar to Figure 2 and illustrating a modification of the apparatus;

Figure 6 is an enlarged cross sectional view taken substantially along a plane as indicated by the line 6—6 of Figure 5;

Figure 7 is a fragmentary plan view of a modified form of the platen;

Figure 8 is a sectional view thereof taken substantially along a plane as indicated by the line 8—8 of Figure 7;

Figure 9 is a fragmentary side elevational view, partly in vertical section of another modified form of platen; and Figure 10 is a fragmentary side elevational view partly in section illustrating another type of movable seam welding element.

Referring more specifically to the drawings, a circular seam welding apparatus as illustrated in Figures 1 to 4 is designated generally 12 and includes a vertically disposed bearing 13 having a downwardly opening socket 14 in which the upper end of shaft 15 is journalled. A suitable thrust bearing element 16 may be interposed between the inner end of the socket 14 and the upper end of the shaft 15. A gear or pinion 17 is fixed to the shaft 15 below the bearing 13 and an annular thrust bearing element 18 may be interposed between the lower end of the bearing 13 and the gear 17. The bearing 13 is provided near its lower end with an outwardly projecting flange or collar 19 forming a support for a plurality of headed bolts 20 which extend downwardly therethrough, and the lower ends of which are threaded into openings 21 of a disc 22 for supporting the disc beneath the gear 17. The disc 22 has a central opening 23 which is preferably lined by a bushing 24 in which the lower end of the shaft 15 is journalled. The upper surface of the portion of the disc 22 surrounding the opening 23 and bears against the underside of the gear 17 for supporting the shaft 15 in the socket 14. The bearing 13 may be provided with any suitable type of support, not shown by means of which the bearing and the parts supported thereby may be displaced upwardly and downwardly. As illustrated in Figure 1, a driving gear 25 is rotatably mounted in a suitable support 26. Gear 25 may be driven in any suitable manner, not shown, and meshes with the gear or pinion 17 for revolving the shaft 15 relatively to the bearing 13 and disc 22. The support 26 will likewise be suitably mounted for up and down reciprocating movement with the bearing 13.

A plate 27 is secured by fastenings 28 to the lower end of the shaft 15 and is provided with a pair of depending apertured ears 29 between which is received a restricted apertured end 30 of an arm 31. A pivot pin 32 extends through the end 30 and ears 29 to mount the arm 31 for vertical swinging movement. The arm 31, as illustrated in Figure 2, is provided with a depending post 33 adjacent its outer end having a fork portion 34 at its lower end in which a seam wheel 35 is rotatably mounted and journalled on a removable axle 36. A pair of collars 37 formed of split sections connected by fastenings 38 is detachably mounted on the arm 31. The collar unit 37 has a restricted intermediate portion or sleeve 39 on which a roller 40 is journalled for rotation between the collars.

An annular cam track 41 is detachably secured to the underside of the disc 22 by a plurality of fastenings 42. The cam track 41 has an undulating bottom surface 43 which is engaged by the cam wheel 40. Said annular cam surface 43 is transversely bevelled, as illustrated in Figure 2 so that the periphery of the wheel 40 will engage flush thereagainst.

A spring 44 has one of its ends secured to the plate 27 and is provided with an elongated slot 45 near its opposite end which loosely engages the shank of a headed fastening 46 which extends upwardly from the arm 31. The spring 44 yieldably supports the arm 31 and maintains the roller 40 against the cam surface 43.

A stationary work supporting platen 47 includes a head 48 and a depending stem 49. The stem 49 is detachably clamped in an electrode holding arm, a portion of which is shown at 50. The upper, work engaging surface 51 of the platen head 48 may be of any desired shape to conform to the contour of a work piece 52 which is supported thereon. For example, the supporting surface 51 may be elongated and oval shaped in cross section to support a portion of a cylinder constituting the work piece and so that a portion of the work piece or cylinder to which a flange or boss is to be welded will be supported in fitting engagement on the surface 51. Likewise, the surface 51 may be of various other shapes or configurations for supporting work pieces of other shapes.

The seam welding wheel 35 constitutes one electrode of the resistance welding unit 12 and the platen 47 constitutes the other electrode thereof. Said electrodes may be interposed in any suitable manner in an electric circuit, not shown, as for example by an electrical conductor 53 in electrical contact with the platen 47 through the electrode holder arm 50, and an electrical conductor 54 which may be connected to the cam track 41 by one of the fastenings 42 so that current may flow through the cam track 41, roller 40, sleeve 39, arm 31 and post 33 to the seam wheel 35. The welding is accomplished by the heat created through the resistance afforded by the metal to the passage of the electric current through the work piece or pieces between the electrodes 35 and 47. As the shaft 15 is revolved by the driving gear 25 meshing with the gear 17, the wheel 35 travels in a circular path and moves upwardly and downwardly about the pivot 32 of the arm 31 as the roller 40 rides the undulating cam track surface 43, to maintain the wheel 35 at all times in engagement with the work piece 52. Obviously, various cam tracks 41 may be employed having cam surfaces 43 to correspond with the curvature of different work pieces for maintaining proper contact and pressure of the wheel 35 on the work piece during its complete travel in a circular path. Any suitable means, such as air pressure, not shown, may be employed for exerting a downward pressure on the bearing 13 to maintain a proper pressure of the wheel 35 against the work piece and for elevating the wheel after the welding operation has been completed. As previously stated, the spring 44 prevents the arm 31 from swinging downwardly when the wheel 35 is raised out of engagement with the work piece and causes the roller 40 to maintain engagement with the surface 43. Thus, the unit 12 may effectively function for accomplishing various circular welds such as welding a flange or boss to a cylinder.

Figure 5 illustrates a slightly different form of wheel supporting arm 31a which differs from the wheel supporting arm 30 in that the wheel supporting post 33a is spaced a greater distance from the terminal or outer end of the arm 31a and nearer the pivot 32a and the roller 40a is journalled beyond the post 33a. The modified structure as illustrated in Figure 5 is best adapted for making smaller circular welds and it will be obvious that the post 33a may be disposed at any distance from the pivot 32a and could be slidably connected to the arm 31a. The other parts as illustrated in Figure 5 correspond with the parts as illustrated in Figure 2.

Figure 10 illustrates another variation of the wheel supporting post and which is shown as being of the caster type and is designated generally 55. The post 55 has a stem 56 at its upper end which extends through and is journalled in an opening 57 of an arm 58, which may otherwise correspond to the arm 31. The post 55 is detachably and swivelly connected to the arm 58 and said arm may be provided with any number of longitudinally spaced openings 57 to position the post 55 at different distances from the pivot of the arm 58. A fork 59 constituting the lower end of the post 55 and in which the seam wheel 35b is journalled, is curved so that the seam wheel will be in a trailing position relatively to the axis of the post and will function similar to a caster wheel. The axle of the seam wheel of each form of the welding unit is removable for replacement of the seam wheel to enable seam wheels having differently bevelled peripheries to be employed where desirable for most effectively engaging differently shaped pieces of work.

Figures 7 and 8 illustrate a platen head 48a to the work engaging surface 51a of which a block of electrical insulating material 60 is detachably secured by a fastening 61. The block 60 is employed to properly center a work piece 52a on the platen surface 51a and extends upwardly through an opening 62 therein. The block 60 may also fit into a boss or flange, not shown, for correctly locating the boss or flange relatively to the opening 62 during the welding operation.

Figure 9 illustrates another form of platen head 48b which is provided with an upstanding integral flange 63 which rises from the work supporting surface 51b thereof and which is adapted to function for the same purpose as the block 60. The block 60 and flange 63 also may additionally function to provide a better heat balance between the parts being welded which is desirable in welding thin materials and heavy materials. Likewise, as illustrated in Figure 9, the head 48b may constitute a detachable top section of the platen 47b which may be detachably secured thereto as by fastenings 64, so that head sections 48b having differently shaped work supporting surfaces 51a and flanges 63b of different sizes and shapes may be interchangeably employed.

Various other modifications and changes are contemplated and may obviously be resorted to, without departing from the spirit or scope of the invention as hereinafter defined by the appended claims.

I claim as my invention:

1. A resistance type welding apparatus for producing circular welds comprising a stationary platen constituting one electrode of the apparatus and having a work piece engaging surface adapted for fitting engagement against a portion of a work piece to be welded, a rotary driven shaft, means supporting said shaft for rotation about an axis disposed substantially perpendicular to the work piece supporting surface, an arm swingably connected to one end of said shaft for swinging movement toward and away from said work piece supporting surface, and a seam welding wheel rotatably supported by said arm and disposed therebeneath and spaced from the axis of the shaft, said wheel forming a movable electrode and being adapted to engage the side of the work piece, opposite to the side thereof engaged by said work supporting surface, and to travel in a circuitous path and in engagement with the work piece for producing a circular seam weld in combination with the stationary electrode, a portion of the workpiece engaged by said wheel and the workpiece supporting surface portion, in contact with said workpiece portion, defining an undulating surface, and means for maintaining the wheel in contact with said undulating surface throughout the circuitous path of movement of the wheel, said means including a fixed part disposed around the shaft between which and the workpiece said arm is disposed, and a part carried by the arm and engaging said fixed part to prevent movement of the wheel out of contact with the workpiece.

2. A resistance type welding apparatus for producing circular welds comprising a stationary platen constituting one electrode of the apparatus and having a work piece engaging surface adapted for fitting engagement against a portion of a work piece to be welded, a rotary driven shaft, means supporting said shaft for rotation about an axis disposed substantially perpendicular to the work piece supporting surface, an arm swingably connected to one end of said shaft for swinging movement toward and away from said work piece supporting surface, and a seam welding wheel rotatably supported by said arm and disposed therebeneath and spaced from the axis of the shaft, said wheel forming a movable electrode and being adapted to engage the side of the work piece, opposite to the side thereof engaged by said work supporting surface, and to travel in a circuitous path and in engagement with the work piece for producing a circular seam weld in combination with the stationary electrode, a stationary cam supported by said means concentrically around the shaft and having an undulating cam track adapted to conform to the contour of the portion of the work piece to be welded and to the contour of the work piece supporting surface engaged thereby, and a roller journalled on said arm and engaging said undulating cam surface for maintaining the seam welding wheel in contact with the work piece during the entire travel of the seam welding wheel in a circular path.

3. A welding apparatus as in claim 2, and spring means connected to the arm and biasing the arm toward the cam member to maintain the roller in contact with the undulating cam surface.

4. A resistance type welding apparatus comprising a stationary electrode having a work piece supporting surface, a rotary driven shaft, means supporting and journalling said shaft for rotation about an axis disposed substantially perpendicular to said work piece supporting surface, an arm swingably connected to the shaft for swinging movement toward and away from the work piece supporting surface, a seam welding wheel constituting a movable electrode rotatably supported by said arm between the work piece supporting surface and arm and adapted to engage and follow the contour of a portion of a work piece to be welded and which is disposed in fitting engagement with the work piece supporting surface, said seam welding wheel being supported by the arm in radially spaced relationship to the axis of the shaft, a portion of the workpiece engaged by said wheel and the workpiece supporting surface portion, in contact with said workpiece portion, defining an undulating surface, and means for maintaining the wheel in contact with said undulating surface throughout the circuitous path of movement of the wheel, said means including a fixed part disposed around the shaft between which and the workpiece said arm is disposed, and a part carried by the arm and engaging said fixed part to prevent movement of the wheel out of contact with the workpiece.

5. A welding apparatus as in claim 4, the said arm being disposed above the stationary electrode for swinging movement in substantially a vertical plane toward and away from the work piece supporting surface.

References Cited in the file of this patent

UNITED STATES PATENTS

| Number | Name | Date |
| --- | --- | --- |
| 1,172,302 | Murray | Feb. 22, 1916 |
| 1,326,912 | Cary | Jan. 6, 1920 |
| 2,095,295 | Smith | Oct. 12, 1937 |
| 2,210,710 | Diamond | Aug. 6, 1940 |
| 2,425,115 | Mulvaney | Aug. 5, 1947 |